(12) United States Patent
Iwato et al.

(10) Patent No.: US 11,961,073 B2
(45) Date of Patent: Apr. 16, 2024

(54) INFORMATION PROCESSING DEVICE

(71) Applicant: AXELL CORPORATION, Tokyo (JP)

(72) Inventors: Hirofumi Iwato, Tokyo (JP); Takehiro Ogawa, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 288 days.

(21) Appl. No.: 17/593,259

(22) PCT Filed: Feb. 5, 2020

(86) PCT No.: PCT/JP2020/004345
§ 371 (c)(1),
(2) Date: Sep. 14, 2021

(87) PCT Pub. No.: WO2020/217640
PCT Pub. Date: Oct. 29, 2020

(65) Prior Publication Data
US 2022/0156734 A1 May 19, 2022

(30) Foreign Application Priority Data

Apr. 26, 2019 (JP) .................................. 2019-086434

(51) Int. Cl.
*G06Q 20/38* (2012.01)
*G06N 7/01* (2023.01)
(Continued)

(52) U.S. Cl.
CPC ........... *G06Q 20/3827* (2013.01); *G06N 7/01* (2023.01); *G06Q 20/065* (2013.01);
(Continued)

(58) Field of Classification Search
CPC .. G06F 9/542; G06F 12/0864; G06F 13/1647; H04L 45/7453
See application file for complete search history.

(56) References Cited

U.S. PATENT DOCUMENTS 7,461,208 B1* 12/2008 Caprioli .............. G06F 12/0864
711/128
2008/0109627 A1* 5/2008 Toyama .............. G06F 13/1647
711/E12.001
(Continued)

FOREIGN PATENT DOCUMENTS

JP S63-66661 A 3/1988

OTHER PUBLICATIONS

WIPO, U.S. International Search Authority, International Search Report and Written Opinion dated Apr. 21, 2020 with English translation in International Patent Application No. PCT/JP2020/004345, 13 pages.

(Continued)

*Primary Examiner* — Saba Dagnew
(74) *Attorney, Agent, or Firm* — MASUVALLEY & PARTNERS; Peter Martinez

(57) ABSTRACT

To achieve efficient reading of data from a memory including a plurality of banks by specifying different banks and accessing the memory from a plurality of hash computation circuits simultaneously, an information processing device includes a memory 1 including a plurality of banks, a plurality of hash computation circuits 8, and an interconnect 2 respectively connecting the banks in the memory 1 and the hash computation circuits 8 to each other, wherein the hash computation circuits 8 execute control in such a manner that read requests for reading data from the memory 1 respectively include bank numbers for specifying different banks in the same cycle.

6 Claims, 7 Drawing Sheets

(51) Int. Cl.
    *G06Q 20/06*       (2012.01)
    *G06Q 20/22*       (2012.01)
    *G06Q 20/36*       (2012.01)
    *H04L 9/32*        (2006.01)
    *H04L 9/00*        (2022.01)

(52) U.S. Cl.
    CPC ....... *G06Q 20/223* (2013.01); *G06Q 20/3678* (2013.01); *G06Q 20/38215* (2013.01); *H04L 9/3236* (2013.01); *H04L 9/50* (2022.05); *H04L 2209/56* (2013.01)

(56) References Cited

U.S. PATENT DOCUMENTS

| | | | |
|---|---|---|---|
| 2008/0183958 A1* | 7/2008 | Cheriton | G06F 3/0604 |
| | | | 711/E12.078 |
| 2010/0005221 A1 | 1/2010 | Nieminen | |
| 2016/0210263 A1* | 7/2016 | Guerin | H04L 67/51 |
| 2016/0259724 A1* | 9/2016 | Steele, Jr. | G06F 12/0292 |
| 2016/0330033 A1* | 11/2016 | Parra | H04L 9/3242 |
| 2017/0068669 A1* | 3/2017 | Levy | H04L 45/7453 |
| 2017/0300875 A1* | 10/2017 | Gilboa | H04L 9/3239 |
| 2019/0020629 A1* | 1/2019 | Baird, III | H04L 9/3297 |
| 2020/0117505 A1* | 4/2020 | Chen | G06F 9/542 |

OTHER PUBLICATIONS

CRYPTOPIX "What is Ethereum's "Ethash"? Algorithm and ASIC resistance mechanism" (with English translation), htttps://vicryptopix.com/ethash/, Nov. 20, 2019, 15 pages.

* cited by examiner

FIG.6

| HASH COMPUTATION CLUSTERS HCL ( ) | HASH COMPUTATION CIRCUIT HAS ( ) | INITIAL VALUES OF COUNTER |
|---|---|---|
| 0 | 0 | 0 |
| 0 | 1 | 16 |
| 0 | 2 | 1 |
| 0 | 3 | 17 |
| 1 | 4 | 2 |
| 1 | 5 | 18 |
| 1 | 6 | 3 |
| 1 | 7 | 19 |
| . | . | . |
| . | . | . |
| . | . | . |
| 7 | 28 | 14 |
| 7 | 29 | 30 |
| 7 | 30 | 15 |
| 7 | 31 | 31 |

INFORMATION PROCESSING DEVICE

RELATED APPLICATIONS

This application is the U.S. National Phase of and claims priority to International Patent Application No. PCT/JP2020/004345, International Filing Date Feb. 5, 2020, entitled Information Processing Device; which claims benefit of Japanese Patent Application No. 2019-086434 filed Apr. 26, 2019, entitled Information Processing Device; both of which are incorporated herein by reference in their entireties.

FIELD

The embodiments discussed herein are related to an information processing device, and more particularly to an information processing device suitable for computing a plurality of hash values used in a blockchain or the like in parallel.

BACKGROUND

Use of blockchain technology enables verification that data in a block has not been falsified. Therefore, blockchain technology is used in various services, for example, verification of transactions in virtual currency systems and a smart contract that can process transactions with secured credit without a third party.

There are various blockchains related to virtual currency systems, which representatively include Bitcoin and Ethereum. In these virtual currency systems, computation of a hash function, called proof-of-work (PoW), is performed to find out a nonce that is a key for linking blocks with a chain.

Computation of a hash function has been conventionally performed by using a CPU and a GPU. In recent years, however, an ASIC (application specific integrated circuit) for computing a hash function is used, those who have capital to be able to prepare a large number of ASICs are placed in an advantageous position, and centralization of mining is becoming a problem.

Meanwhile, Ethereum has a feature that an algorithm for computation of a hash function for finding out a nonce includes a procedure of randomly referring to a few gigabyte size dataset called DAG that has been calculated beforehand, and the speed of access to a memory where the DAG is stored limits the processing speed of proof-of-work (PoW).

Therefore, Ethereum is more ASIC-resistant as compared with computation of a hash function in Bitcoin, but has a problem of high-speed access to data stored in the DAG in order to perform mining of virtual currency of Ethereum (to identify a nonce).

<Outline of Algorithm for Proof-of-Work (PoW)>

FIG. 8 illustrates the outline of an algorithm for proof-of-work (PoW) conventionally used in Ethereum.

First, hash computation using the SHA3 (Keccak512) algorithm is performed for preceding block-header information and a guessed nonce (Step S1) to obtain a computation result (Mix0).

Thereafter, hash computation using a Mixing function for generating an address (an FNV hash algorithm) is performed for the computation result (Mix0) to obtain information on an address of a DAG, and 128-byte data stored at the obtained address is read (Step S2).

Thereafter, computation is performed for the read data and the computation result (Mix0) using a Mixing function for generating Mix data (an FNV hash algorithm) to obtain Mix1 as a computation result (Step S3). Hash computation is also performed for Mix1 as the computation result by using the Mixing function for generating an address in the identical manner to that described above to obtain information on an address of a DAG. Data of the DAG stored at the obtained address is read, and computation by an FNV hash algorithm is performed using the read data and Mix1 to obtain Mix2.

The hash computation for generating an address, the reading of data from a DAG, and the hash computation for generating Mix data performed using the read data and a Mix value described above are repeated 64 times (Step S4) to obtain Mix64 (Step S5).

Thereafter, processing such as data compression is performed using a postprocessing function (Step S6). When an obtained hash value satisfies a specific condition (the obtained hash value is equal to or smaller than a threshold as a target), the proof-of-work (PoW) is regarded as being successful (Step S7).

An algorithm used for proof-of-work (PoW) used in Ethereum is called "Ethash" and its algorithm is disclosed on the website shown by the following URL.

Non patent literature 1: PoW algorithm in Ethereum https://vicryptopix.com/ethash/

Since address information (page information) of a DAG used in hash computation is determined by a computation result (a Mix value) of each phase (each of Mix0 to Mix63) in repetition of Step S4 described above, acquisition of DAG data cannot be performed in parallel. Accordingly, high-speed access to the DAG is required in order to achieve high-speed mining.

A HBM (High Bandwidth Memory) or a HBM2 can be used as a memory storing a DAG dataset therein in order to access the memory at high speed. Since the HBM and the HBM2 each use a DRAM, it is necessary to shield a latency of the DRAM and to make the most of a memory bandwidth.

Since a read address in reading of a DAG in hash computation has randomness, it is impossible to avoid bank access conflict in a memory including a plurality of banks even if a large number of hash computation circuits are simply prepared and are caused to perform parallel computation. Therefore, memory access efficiency is reduced.

An embodiment of the present invention has been made in view of the above problems and an object thereof is to execute control not to cause conflict of bank accesses from a large number of hash computation circuits to a memory including a plurality of banks, thereby making the most of a memory bandwidth effectively.

SUMMARY

In order to solve the above problem, the invention according to a first aspect provides an information processing device comprising: a memory including a plurality of banks; a plurality of hash computation circuits; and an interconnect that respectively connects the banks in the memory and the hash computation circuits to each other, wherein each of the hash computation circuits executes control in such a manner that read requests for reading data from the memory respectively include bank numbers for specifying different banks in the same cycle.

According to the present invention, a plurality of hash computation circuits access a memory including a plurality of banks by respectively specifying different banks. It is therefore possible to efficiently read data from the memory.

BRIEF DESCRIPTION OF DRAWINGS

FIG. 6 is a diagram indicating that initial values set in counters in respective hash computation circuits of the information processing device according to the embodiment of the present invention are different from each other, in the form of a table.

DESCRIPTION OF EMBODIMENTS

Figure 1:
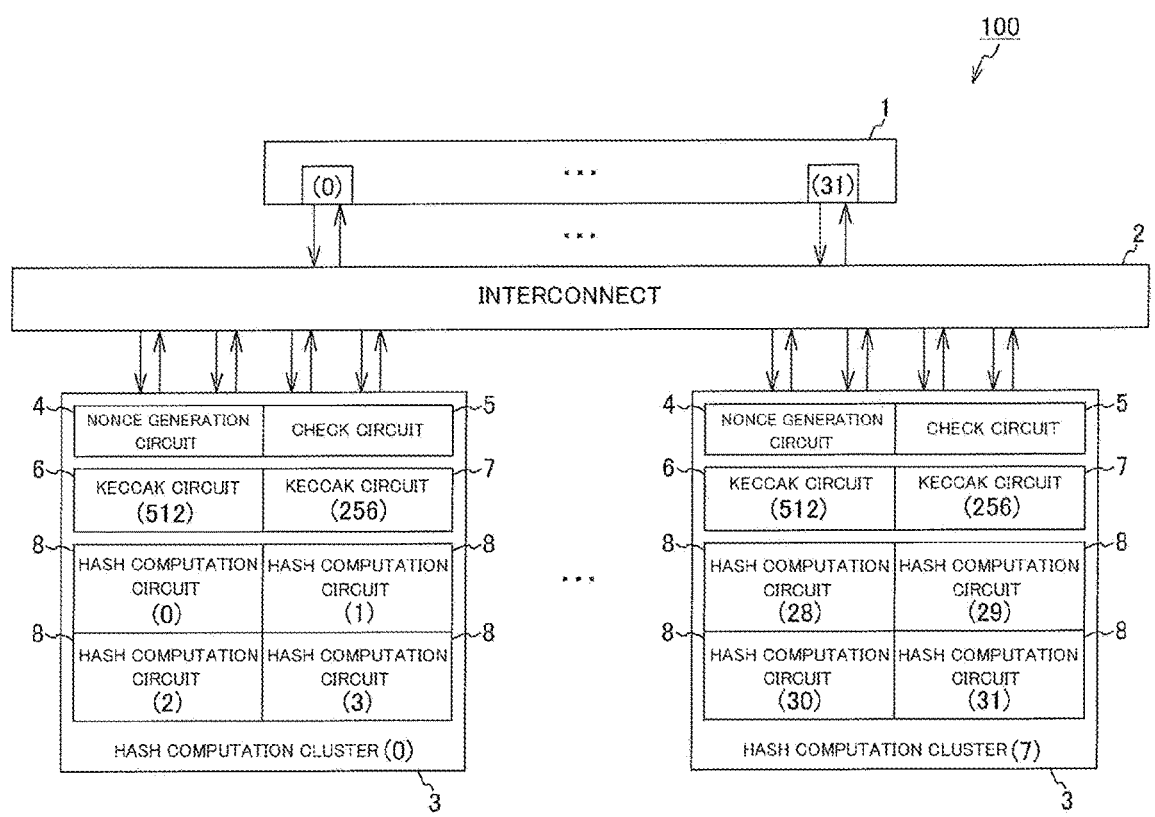
FIG. 1 is a diagram illustrating a configuration of an information processing device according to an embodiment of the present invention.

The present invention is explained in more detail with an embodiment illustrated in the drawings.

In the present invention, a plurality of hash computation circuits access a memory including a plurality of banks by specifying different banks simultaneously, so that the bandwidth of the memory is effectively used.

That is, an information processing device according to the present invention is an information processing device that includes a memory including a plurality of banks, a plurality of hash computation circuits, an interconnect that respectively connects the banks in the memory and the hash computation circuits to each other, characterized in that the hash computation circuits execute control in such a manner that read requests for reading data from the memory respectively include bank numbers for specifying different banks in the same cycle.

With the configuration described above, it is possible to effectively use the bandwidth of the memory including the banks by specifying different banks and accessing the memory from the hash computation circuits simultaneously.

Characteristics of the present invention described above are explained in detail with reference to the drawings mentioned below. Note that, unless otherwise specified, constituent elements, types, combinations, shapes, and relative arrangements thereof described in the embodiment are not intended to limit the scope of the present invention solely thereto and are only explanatory examples.

<Information Processing Device>

An information processing device according to an embodiment of the present invention performs computation of a hash function using a processor, a high-speed memory (for example, a HBM), and a semiconductor integrated circuit such as an ASIC or an FPGA. The memory is configured to include multiple banks. The semiconductor integrated circuit performing computation of a hash function employs multiple threads in order to shield an access latency of the memory and performs parallel computation that can make full use of the bandwidth of the memory.

In order to perform proof-of-work (PoW) in Ethereum at high speed, it is effective to read 128-byte data stored in a DAG (hereinafter, "DAG data") at high speed.

Therefore, the DAG data is stored in a HBM (High Bandwidth Memory) or a HBM2 having a broad bandwidth in the present embodiment.

Since the HBM and the HBM2 have a configuration in which DRAMs are stacked, a long access latency occurs.

In the present embodiment, a hash computation circuit employs a multi-thread configuration in order to shield the access latency of the memory.

FIG. 1 is a diagram illustrating a configuration of the information processing device according to the embodiment of the present invention.

An information processing device 100 includes a memory 1, an interconnect 2, and a plurality of hash computation clusters 3.

The memory 1 is called a HBM2 (High Bandwidth Memory 2) and is a DRAM (Dynamic Random Access Memory) having a multi-bank configuration that includes a plurality of banks (32 banks in the present embodiment).

The interconnect 2 connects the memory 1 and each of hash computation circuits 8 included in the hash computation clusters 3 to each other.

Each of the hash computation clusters (HCL(0) to HCL(7)) 3 includes a nonce generation circuit 4, a check circuit 5, a Keccak circuit (512) 6, a Keccak circuit (256) 7, and the hash computation circuits 8.

The nonce generation circuit 4 generates a candidate of a nonce as a key for linking blocks with a chain.

The check circuit 5 determines whether a computation result is a desired one (mining is successful).

The Keccak circuit (512) 6 is a logic of computing a hash function called Keccak. The Keccak circuit (512) 6 is a circuit for hashing preceding block-header information and a guessed nonce, as with SHA3 described in Background.

The Keccak circuit (256) 7 performs hash computation for Mix64 that is a hash computation result to compress the computation result. The Keccak circuit (256) 7 is identical to a Mix digest (32b) described in Background.

HAS(0) to HAS(3) that are the hash computation circuits 8 are arithmetic logics each executing an FNV hash function algorithm, and each perform hash computation 64 times by combining an input Mix value and data obtained from a DAG.

The information processing device 100 includes eight hash computation clusters 3 each having four hash function units implemented therein, and thus includes total 32 hash computation units HAS(0) to HAS(31).

Meanwhile, the number of each of the Keccak circuit (512) 6, the Keccak circuit (256) 7, the nonce generation circuit 4, and the check circuit 5 implemented in each hash computation cluster 3 is one. These circuits are shared by the four hash computation circuits 8.

The number of implemented hash computation circuits 8 is determined by the bandwidth of the memory 1, the bus width of the interconnect 2, the operating frequency, and the amount of handled data.

Assuming that the bandwidth of the memory 1 is 512 GB/sec, the bus width of the interconnect 2 is 64 bytes, and the operating frequency is 250 MHz, for example, the bandwidth of the memory 1 is used up by the hash computation circuits 8 each processing 128-byte DAG data when the number of the hash computation circuits 8 is 32. That is, in order to process 128-byte data by the interconnect 2 with a bus width of 64 bytes, data processing is performed once in two clocks, and therefore "512 GB/(128 byte×125 MHz) =32" is obtained.

Further, the number of the hash computation circuits 8 in each hash computation cluster 3 is selected in such a manner that the throughputs of the Keccak circuit (512) 6 and the Keccak circuit (256) 7 and the throughputs of the hash computation circuits 8 are balanced with each other.

<Relation between Hash Computation Circuits, Interconnect, and Memory>

Figure 2:
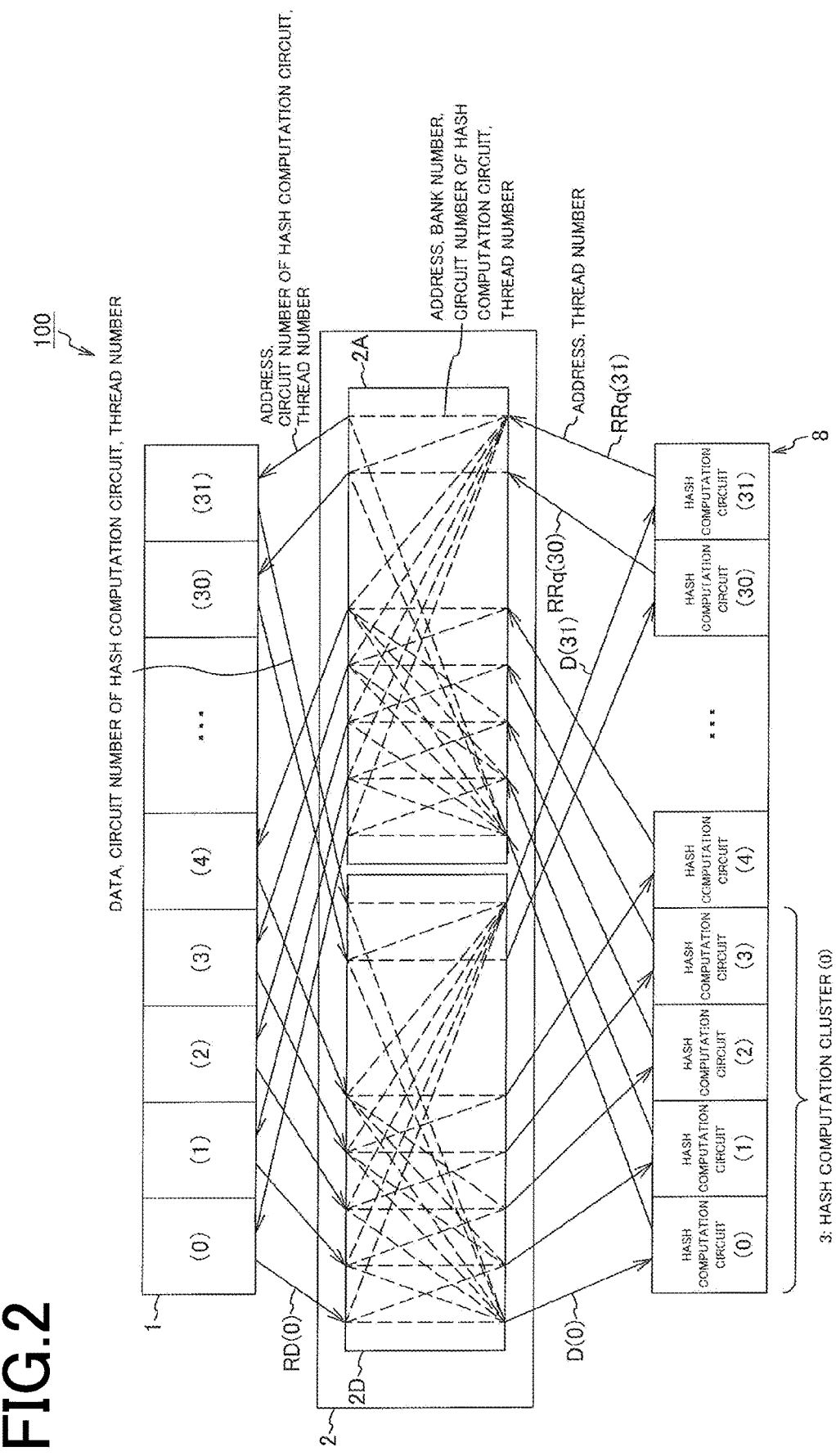
FIG. 2 is an outline diagram illustrating a relation between hash computation circuits, an interconnect, and a memory in the information processing device according to the embodiment of the present invention.

FIG. 2 is an outline diagram illustrating a relation between hash computation circuits, an interconnect, and a memory in the information processing device according to the embodiment of the present invention. Reference signs given to parts in FIG. 2 are identical to those in FIG. 1, respectively. The hash computation circuits (HAS(0) to HAS(3)) included in the eight hash computation clusters (HCL(0) to HCL(7)) illustrated in FIG. 1 are labeled with consecutive numbers as HAS(0) to HAS(31) for convenience of description.

Therefore, in FIG. 2, HAS(4) corresponds to HAS(0) in the hash computation cluster HCL(1), and HAS(30) and HAS(31) respectively correspond to HAS(2) and HAS(3) in the hash computation cluster HCL(7).

The interconnect 2 controls a bank (0) to a bank (31) in the memory 1 as control objects as illustrated in FIG. 2, and is configured to be connected to any of the bank (0) to the bank (31) in the memory 1 in accordance with each of addresses (banks) simultaneously output in parallel from the respective hash computation circuits. At a certain timing, a bank to be accessed by one of the hash computation circuits 8 via the interconnect 2 is any one, and the hash computation circuits 8 are controlled in such a manner that banks to be respectively accessed by the hash computation circuits 8 do not overlap. In this manner, the interconnect 2 uses the bandwidth of the memory 1 effectively.

The interconnect 2 is configured by an address router 2A and a data router 2D.

As illustrated, each hash computation circuit 8 outputs a thread number thereof (described later) and an address, and the address router 2A of the interconnect 2 adds a circuit number of the hash computation circuit and a bank number and then outputs a read request RRq from the hash computation circuit to the memory 1.

Further, in an output stage of the address router 2A of the interconnect 2, data related to the bank number is deleted, and the address and the circuit number and the thread number of the hash computation circuit are supplied to the memory 1. The memory 1 reads DAG data based on the supplied address information. The circuit number and the thread number of the hash computation circuit are temporarily memorized in the memory 1, and are used when the read DAG data is output to the hash computation circuit. Further, the address router 2A of the interconnect 2 is configured to be connected to any of the bank(0) to the bank(31) in accordance with the address (bank) number included in the read request RRq output from the hash computation circuit 8.

Here, in FIG. 2, RRq represents a read request from the hash computation circuit 8 and RD represents DAG data to be output from the memory 1.

The DAG data read from the memory 1 is supplied to the data router 2D of the interconnect 2 together with read data RD and the circuit number and the thread number of the hash computation circuit that has issued the read request RRq, and route control is executed in accordance with the circuit number of the hash computation circuit, so that data is supplied to the hash computation circuit that has issued the read request RRq. At this time, data related to the circuit number of the hash computation circuit is deleted in an output stage of the data router 2D, and the data and the thread number are supplied to the hash computation circuit.

<Configuration of interconnect>

Figure 3:
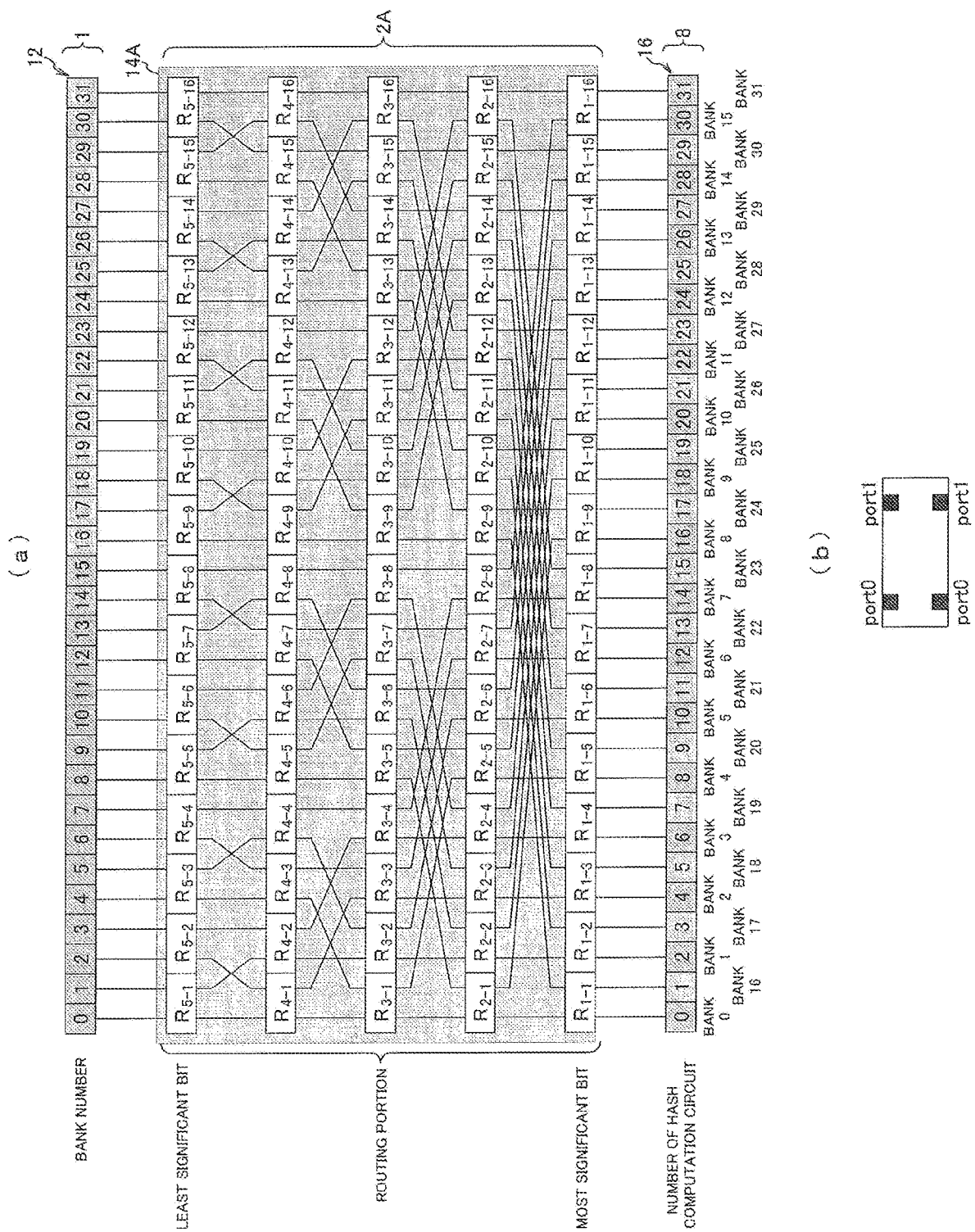
FIG. 3A is a diagram illustrating a configuration of the interconnect of the information processing device according to the embodiment of the present invention, and port numbers of each router.
FIG. 3B is a diagram illustrating a configuration of one router.

FIG. 3A is a diagram illustrating a configuration of the address router 2A of the interconnect 2 of the information processing device according to the embodiment of the present invention, and port numbers of each router. FIG. 3B is a diagram illustrating a port configuration of one router. The data router 2D of the interconnect 2 also has the same configuration as the address router 2A.

In FIG. 3A, a memory-bank side I/O provided in the memory 1 is denoted by a reference sign 12, a routing portion of the address router 2A provided in the interconnect 2 is denoted by a reference sign 14A, and an I/O of a hash computation circuit provided in the hash computation clusters (HCL(0) to HCL(7)) is denoted by a reference sign 16.

In the routing portion 14A, the number of router rows is determined in accordance with the number of banks and the number of hash computation circuits. In a case where the number of banks and the number of hash computation circuits are 32 as in the present embodiment, the number of required router rows is equal to 5 that is the number of bits when 32 is written in binary.

As for a row of routers (R1-1 to R1-16) of the routing portion 14A which are connected to the I/Os of the hash computation circuits, a route is controlled by "0" or "1" as the most significant bit (the fifth bit) of a bank number to be output from each hash computation circuit 8 (the number of a FIFO described later). As for the next row of routers (R2-1 to R2-16), a route is controlled by a value of the second bit from the most significant bit.

Similarly, as for the third, fourth, and fifth rows of router from the I/Os of the hash computation circuits, routes are controlled by a value of the third bit, a value of the fourth bit, and a value of the fifth bit (the least significant bit) of the bank number, respectively.

The row of routers (R5-1 to R5-16) controlled by the least significant bit of the bank number is connected to I/Os of respective banks in the memory 1. Further, the routing portion 14A is configured by a plurality of routers in butterfly connection. Each router has two input ports and two output ports as illustrated in FIG. 3B, and is configured to connect an input "0" to a port 0 (port0) and an input "1" to a port 1 (port1) from the input ports.

For example, a port 1 (port1) of an output port of a router R1-1 in the first row when viewed from the hash computation circuit side is connected to a port 0 (port0) of an input port of a router R2-9 in the second row, and a port 1 of an output port of a router R1-8 in the first row is connected to a port 0 (port0) of an input port of a router R2-16 in the second row in a similar manner. Output ports 1 of routers R1-2 to R1-7 in the first row are connected to input ports 0 (port0) of routers R2-10 to R2-15 in the second row, respectively. Further, output ports 0 of the routers R1-1 to R1-8 are connected to input ports 0 of the routers R2-1 to R2-8 in the second row, respectively.

Meanwhile, wire connection is made in such a manner that routers R1-9 to R1-16 in the first row are connected at output ports 1 to input ports 1 of the routers R2-9 to R2-16 in the second row and are connected at output ports 0 to input ports 1 of the routers R2-1 to R2-8 in the second row, respectively.

Connection between input and output ports in the second to fifth rows are as illustrated in FIG. 3A.

For example, in a case where a hash computation circuit with a circuit number 0 specifies a bank number 0 of the memory 1, a bank number to be input from the hash computation circuit to the routing portion 14A is 00000 and thus the ports 0 are selected in all the routers R1-1, R2-1, R3-1, R4-1, and R5-1, so that it is possible to perform data transmission with an I/O connected to the bank with the bank number 0.

Further, in a case where the hash computation circuit with the circuit number 0 specifies a bank number 31 of the memory 1, a bank number to be input from the hash computation circuit to the routing portion 14A is 11111 and thus the ports 1 are selected as output ports in all the routers R1-1, R2-9, R3-13, R4-15, and R5-16, so that it is possible to perform data transmission with an I/O connected to the bank with the bank number 31.

When output ports determined as a result of routing for two inputs are the same as each other in each router, arbitration occurs and thus it becomes impossible to effectively use the bandwidth of the bus. For this reason, data to be input to the same router has a predetermined rule.

More specifically, as initial values, even numbers (0, 2, 4, . . . , 30) as circuit numbers of hash computation circuits are assigned to bank numbers 0 to 15 of the memory 1, and odd numbers (1, 3, 5, . . . , 31) as circuit numbers of hash computation circuits are assigned to bank numbers 16 to 31 of the memory 1. By this assignment, data conflict is avoided. With this configuration, the most significant bits of bank numbers to be output from two different hash computation circuits connected to the same router are always different from each other, and thus no arbitration is required. Therefore, a data transfer rate can be increased.

Although there are many combinations that make bits as objects of connection control in a router different from each other, initial setting illustrated in FIG. 3A can make arbitration unnecessary also in the second to fifth rows of the routing portion.

Bits representing a bank number of the memory 1, to be output from the hash computation circuit 8, control the routing portion 14A. A memory address is an address by which DAG data in a bank is read. A circuit number of the hash computation circuit 8 is used for returning data read from the memory 1 to the hash computation circuit 8 that is a request source. A thread number is used for controlling a thread of the hash computation circuit 8.

<Data Transfer>

Next, there is described control of transferring DAG data read from a bank in the memory 1 to a hash computation circuit as a request source.

When DAG data read from a bank in the memory 1 is transferred to a hash computation circuit as a request source, the DAG data is transferred via the data router 2D. The data router 2D has the same configuration as the address router 2A illustrated in FIG. 3A, and is different from the address router 2A only in a data flow.

Since the hash computation circuit 8 has supplied its own circuit number to the routing portion 14A of the address router 2A as descried before, the routing portion 14A of the data router 2D performs routing by using this circuit number when data read from each bank is transferred as a result of the read request RRq.

For example, when a value "10000" representing the bank number 16 is input to the routing portion of the address router 2A from a hash computation circuit with a circuit number 1, routing is controlled based on the bank number. When the read request RRq is issued to a bank with the bank number "16" in the memory 1, DAG data read from the bank with the bank number "16" in the memory 1 is transferred to the hash computation circuit with the circuit number 1 as a request source via the data router 2D.

More specifically, the memory 1 accepts a read request to the bank with the bank number "16". After a predetermined latency, DAG data is read and output to the hash computation circuit with the circuit number 1 as a request source. At this time, the routing portion 14A of the data router 2D controls routing by using a value obtained by shifting the least significant bit that represents the circuit number of the hash computation circuit as the source of the read request to the most significant bit and shifting down each of the remaining bits.

The hash computation circuit with the circuit number 1 supplies 00001 as a circuit number to the address router 2A, and a routing controller (not illustrated) of the interconnect 2 converts the received circuit number to 10000 and supplies DAG data read from the bank with bank number "16", data of the converted circuit number, and a thread number to the data router 2D. The data router 2D determines a route in the row of routers (R5-1 to R5-16) based on the least significant bit of the data of the converted circuit number. Thereafter, route determination is also performed in the rows of routers (R4, R3, R2, and R1) respectively based on values of the second bit, the third bit, the fourth bit, and the fifth bit (the most significant bit) from the least significant bit, and the read DAG data is supplied to the hash computation circuit with the circuit number 1.

Another configuration may be employed in which bit shifting of a circuit number in the routing controller is not performed and the rows of routers of the routing portion 14A illustrated in FIG. 3A are inverted, that is, the routers R1-1 to R1-16 are arranged as the closest row of routers to the I/Os on the memory bank side, the routers R5-1 to R5-16 are arranged as the closest row of routers to the I/Os on the hash computation circuit side, the second to fourth rows of routers are also arranged at inverted positions in association with the above arrangement, routing is controlled in the row of routers R1-1 to R1-16 by the most significant bit of a circuit number, and routing is controlled in the row of routers R5-1 to R5-16 by the least significant bit of the circuit number.

By inverting the rows of routers and connection therebetween in an address router and a data router as described above, it becomes unnecessary to process an address of a circuit number, for example, swap bits or shift bits in routing control in the data router.

However, since the latter configuration makes wiring complicated when semiconductor elements constituting the interconnect 2 are implemented, it is preferable that the address router 2A and the data router 2D have similar configurations to each other.

<Hash Computation Circuit>

Figure 4:
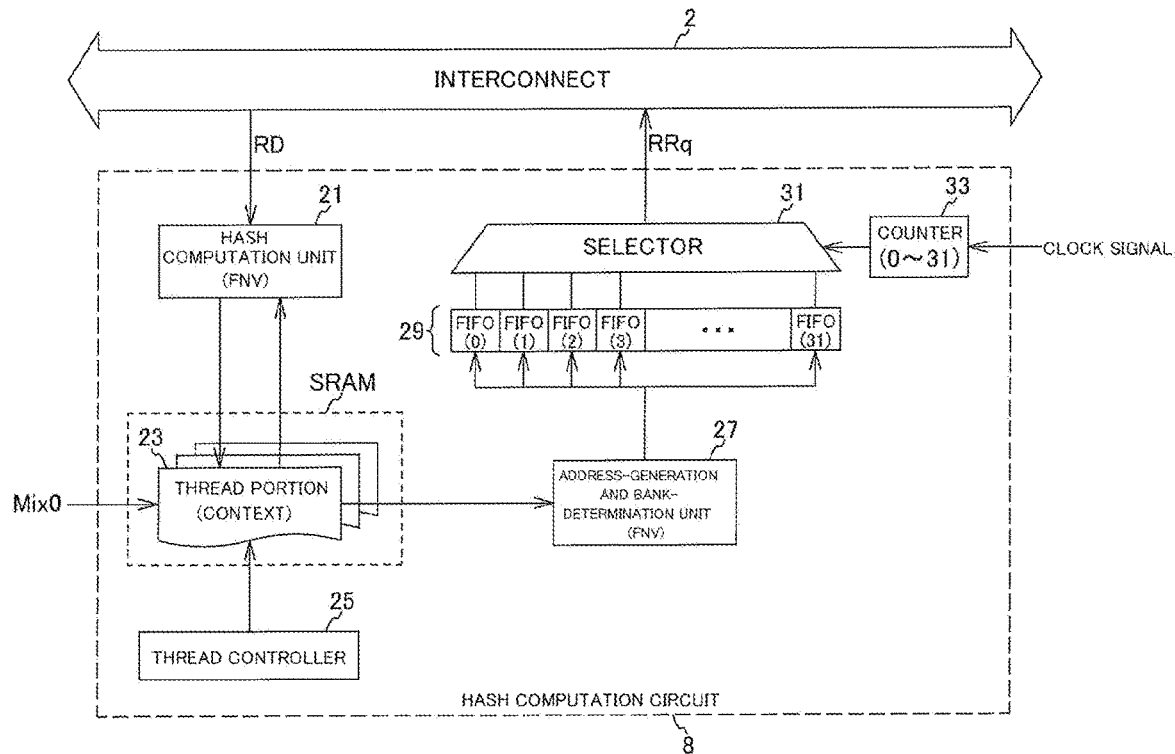
FIG. 4 is a diagram illustrating an outline of the hash computation circuit of the information processing device according to the embodiment of the present invention.

FIG. 4 is a diagram illustrating an outline of a hash computation circuit of the information processing device according to the embodiment of the present invention.

The hash computation circuit 8 includes a hash computation unit (an FNV algorithm) 21, a thread portion 23, a thread controller 25, an address-generation and bank-determination unit (an FNV algorithm) 27, FIFOs 29, a selector 31, and a counter 33.

As described in FIG. 1, the Keccak circuit (512) 6 performs hash computation for data acquired from the nonce generation circuit 4 to obtain a computation result (Mix0) and outputs the computation result (Mix0) to the thread portion 23 provided in the hash computation circuit 8.

The thread portion 23 outputs the computation result (Mix0) to the address-generation and bank-determination unit 27 based on the context of the thread portion 23. The address-generation and bank-determination unit 27 performs hash computation based on an FNV algorithm for the computation result (Mix0) acquired from the thread portion 23, thereby obtaining a bank number of a bank in the memory 1 and an address in the memory 1 where next reading is to be performed.

The thread controller 25 controls thread execution by the thread portion 23 based on information such as availability and the calculation status (during calculation, calculation completed) of a multi-thread context in an SRAM constituting the thread portion 23. Further, the number of threads held by the thread portion 23 is set to be sufficiently larger than an access latency of the memory 1. This setting can completely shield the latency.

Next, the address-generation and bank-determination unit 27 stores data representing the address in the memory and a thread number in the FIFO 29 corresponding to the obtained bank number. Each FIFO 29 is a memory that stores therein a plurality of pieces of data in a first-in and first-out manner, and can store therein data for eight stages, for example.

Next, the selector 31 selects one of the 32 FIFOs 29 based on a counter value to be input from the counter 33, and a read request RRq including the address and the thread number is sent from the selected FIFO 29 to the interconnect 2 via that selector 31. At this time, since the interconnect 2 can understand, from the bus side, the circuit number of a hash computation circuit that outputs the read request RRq and the number of a FIFO from which the request is output via the selector 31 of each hash computation circuit, the interconnect 2 uses the circuit number of the hash computation circuit and the bank number (=the FIFO number) for routing of the read request and routing of transfer of read data.

<Outline of Algorithm for Proof-of-Work (PoW)>

With reference to FIGS. 1 and 4, the outline of an algorithm for proof-of-work (PoW) by a hash computation circuit is described.

(1) The Keccak circuit (512) 6 performs hash computation for 320-bit data including a 256-bit header and a 64-bit nonce to obtain a 512-bit computation result, and repeats this computation twice to obtain 1024-bit Mix0.

(2) The thread portion 23 of the hash computation circuit 8 supplies data including Mix0 and a thread number to the address-generation and bank-determination unit 27. FNV hash computation is then performed for data of Mix0 in the address-generation and bank-determination unit 27, so that a bank number and information on an address are obtained.

(3) The address-generation and bank-determination unit 27 stores the address and the thread number in the FIFO 29 which has the same number as the obtained bank number.

(4) When the selector 31 connects any of the FIFOs 29 to the interconnect 2, a read request (an address and a thread number) stored in that FIFO 29 is supplied to a desired bank in the memory 1 via the interconnect 2. Since the bank number of the bank in the memory 1 is equal to the number of the FIFO selected by the selector 31, the interconnect 2 can understand the bank number of the bank to which the read request is to be supplied by checking the FIFO number, and controls the routing portion 14A of the address router 2A based on the bank number. Further, since it is possible to understand a circuit number of the hash computation circuit 8 from the interconnect 2 side, the interconnect 2 memorizes therein the circuit number of the hash computation circuit 8 when accepting the read request, and gives the circuit number of the hash computation circuit 8 again when read data corresponding to the read request is output from the memory 1. In this manner, the interconnect 2 controls routing of the read data.

(5) The read request supplied to the interconnect 2 is supplied to the desired bank in the memory 1, and DAG data is read. Supply of the read request and transfer of the read DAG data via the interconnect 2 have been described with reference to FIGS. 2 and 3.

(6) The DAG data read from the memory 1 via the interconnect 2 is supplied to the hash computation unit 21 of the hash computation circuit 8. In the hash computation unit 21, hash computation is performed based on an FNV algorithm. Mix1 that is a result of hash computation is supplied to the thread portion 23.

(7) Thereafter, Mix1 and a thread number are supplied to the address-generation and bank-determination unit 27. In the address-generation and bank-determination unit 27, FNV hash computation is performed for data of Mix1, so that a bank number of a bank and information on an address where DAG data to be used in next hash computation is stored are obtained.

(8) Thereafter, processes (2) to (6) described above are repeated 63 times (total 64 times when the processing already described is included) to obtain Mix64, and Mix64 thus obtained (1024 bits) is compressed to 256 bits by FNV.

(9) Thereafter, the Keccak circuit (256) 7 performs data compression for Mix64 thus obtained by hash computation, and it is determined in the check circuit 5 whether the result of data compression satisfies a predetermined condition.

<Peripheral Circuits of FIFOs and Selector>

Figure 5:
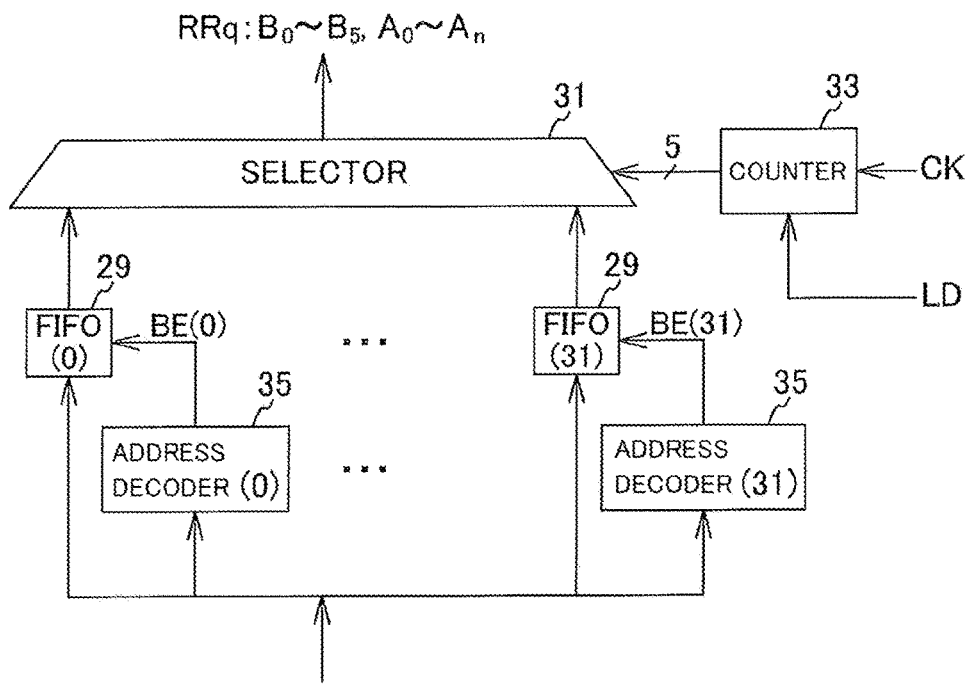
FIG. 5 is a diagram illustrating an example of peripheral circuits of FIFOs and a selector.

FIG. 5 is a diagram illustrating an example of peripheral circuits of FIFOs and a selector.

Address decoders 35(0) to 35(31) are provided between the address-generation and bank-determination unit 27 and the FIFOs 29(0) to 29(31).

The address decoders 35(0) to 35(31) decode the bank numbers (0) to (31) in bank numbers and addresses to be output from the address-generation and bank-determination unit 27 to generate bank enable signals BE(0) to BE(31). By supplying the generated bank enable signals BE(0) to BE(31) to the corresponding FIFOs 29(0) to 29(31), the appropriate bank numbers and addresses are input to the FIFOs 29(0) to 29(31), respectively.

Consequently, in the FIFOs 29(0) to 29(31), the bank numbers (0) to (31) that are the same as the number of the FIFOs 29(0) to 29(31) and addresses are stored in turn.

In the counter 33, an initial value in accordance with a circuit number of a hash computation circuit is set from a controller at the time of initialization. A counter value of the counter 33 is output to the selector 31 and is used as a selection signal.

In this case, the counter value to be output from the counter 33 represents the bank number of a bank to which an address sent from the selector 31 is directed. As described before, the counter value is different between all the hash computation circuits 8 and therefore the bank numbers of banks to which addresses sent from all the hash computation circuits 8 are directed do not overlap in the same cycle.

Counter initial values of the hash computation circuits (HAS(0) to HAS(31)) 8 are as illustrated in FIG. 3A FIG. 6.

As described above, when the counter initial values are set and the information processing device 100 is started up, data in a FIFO selected by the selector 31 is empty immediately after startup, and thus a read request is not output from the hash computation circuit 8. However, by controlling the thread portion 23, the thread controller 25, and the selector 31 in such a manner that read requests accumulated in FIFOs are more than read requests to be output from the FIFOs to the interconnect 2 via the selector 31, read requests are accumulated in the FIFOs, and the information processing device 100 is placed in a state where a read request is always output even when the selector 31 selects any FIFO.

<Initial Value of each Counter>

FIG. 6 is a diagram indicating counter initial values set in counters in respective hash computation circuits of the information processing device according to the embodiment of the present invention in the form of a table. Since the hash computation clusters 3(0) to 3(7) each include the four hash computation circuits 8 (the hash computation circuits (0) to (31)), all initial setting values of the counters 33 included in the respective hash computation circuits 8 are set not to overlap as indicated in FIG. 6. Further, the counter initial values in the hash computation circuits 8 that simultaneously access the same router are selected not to cause arbitration in data transfer.

That is, a counter value is the number of a FIFO in which a read request output to the interconnect 2 is stored, and the number of a FIFO is equal to the bank number of a bank in the memory 1 in which a DAG dataset to be read in response to the read request is stored.

Therefore, the initial values of the counters of the 32 hash computation circuits 8 are set in such a manner that the 32 hash computation circuits 8 respectively access different banks. Also, the counter initial values and wire connection of butterfly connection in the routing portion 14A are set in such a manner that, as for the hash computation circuits 8 accessing the same router simultaneously, different ports are selected in each router in any of the first to fifth rows in the routing portion 14A to prevent arbitration in routing control.

<Thread Configuration in each Hash Computation Circuit>

Figure 7:
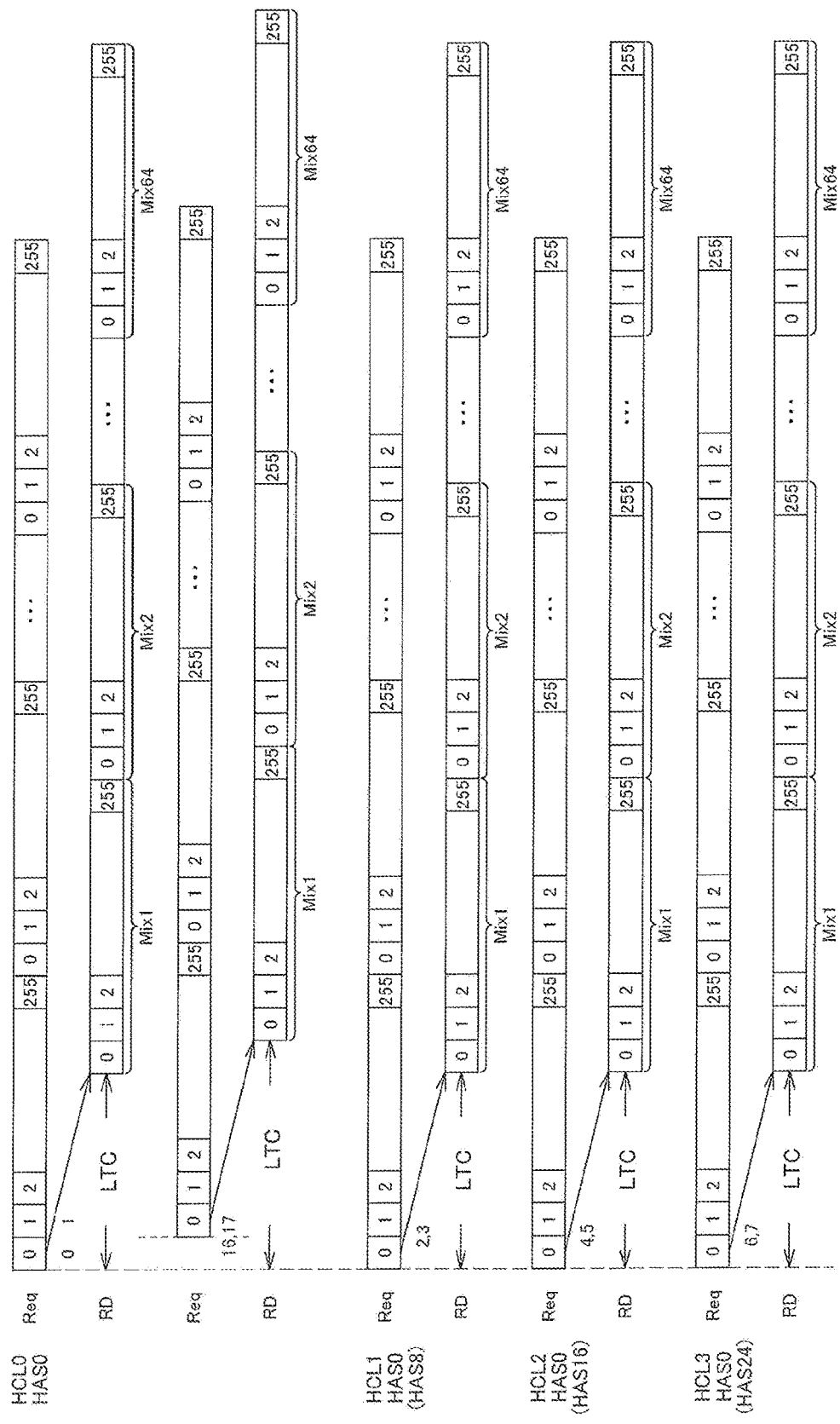
FIG. 7 is a diagram indicating a timing when a latency of the memory is shielded and a thread portion of each hash computation circuit performs processing.
Figure 8:
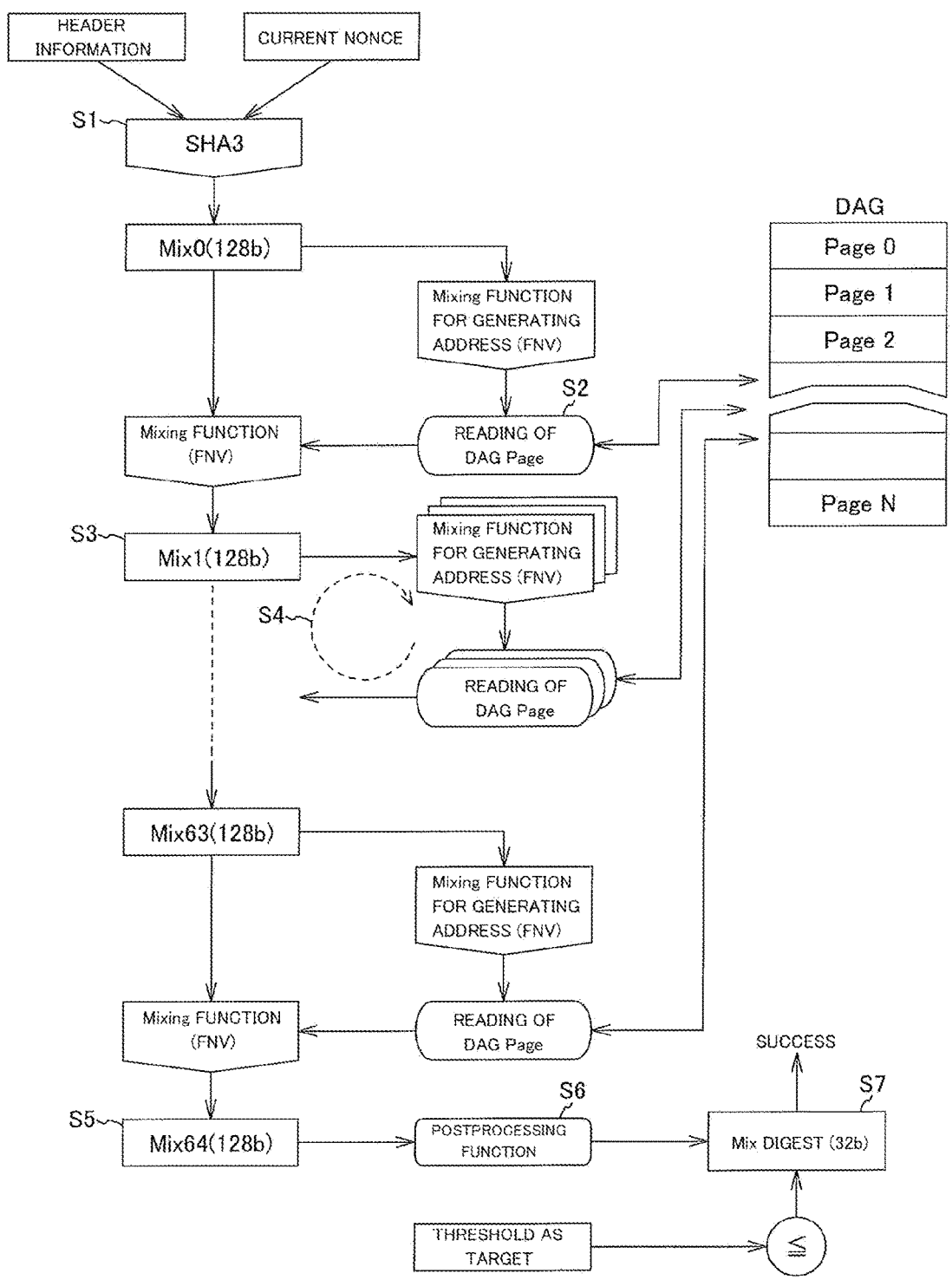
FIG. 8 is a diagram illustrating an outline of an algorithm for proof-of-work conventionally used in Ethereum.

FIG. 7 is a timing chart illustrating a state where a thread portion of each hash computation circuit 8 performs thread processing in order to shield a latency of the memory 1.

In each hash computation cluster 3, the plural (four in the present embodiment) hash computation circuits 8 share the nonce generation circuit 4, the check circuit 5, the Keccak circuit (512) 6, and the Keccak circuit (256) 7. Therefore, the read requests RRq to be output from hash computation circuits belonging to the same cluster are different from each other in output timings. For example, as exemplified in FIG. 7, output timings of the read requests RRq of the hash computation circuit (0) and the hash computation circuit (1) included in the hash computation cluster (0) are shifted from each other. Further, output timings of read data are also shifted from each other in association with the shift between the read requests RRq.

Meanwhile, the hash computation circuits (8), (16), and (24) that respectively belong to the hash computation clusters (1), (2), and (3) output the read requests RRq at the same timing as that of the hash computation circuit (0) included in the hash computation cluster (0), and read data is obtained at the same timing.

FIG. 7 illustrates an example in which the number of threads is 256. It is considered that this number of threads is enough to shield a latency (LTC) of the memory 1.

Further, the number below each thread number indicates a counter value of each hash computation circuit 8 and represents the same information as that illustrated in FIG. 6. Since all the counters 33 respectively controlling the selectors 31 perform a counting operation in synchronization with each other although initial values of the counters 33 are different from each other, neither conflict of addresses in the address router 2A of the interconnect 2 nor conflict of data in the data router 2D occurs.

According to the present embodiment, the present invention has the following characteristic configurations and effects.

<Multi-Thread Configuration>

DAG data is stored in a HBM (High Bandwidth memory) or a HBM2 that has a broad bandwidth. However, a long access latency is generated because the HBM and the HBM2 have a configuration in which DRAMs are stacked.

In the present embodiment, the hash computation circuits 8 employ a multi-thread configuration in order to shield generation of a long access latency. By employing the multi-thread configuration, even when a delay time is generated between a read request and output of read data, a read request and output of read data in another thread are performed during that delay time, and therefore it is possible to efficiently use the bandwidth of the HBM or HBM2.

<Hash Computation Circuits>

In the present embodiment, the plural hash computation circuits 8 employing a multi-thread configuration are included, and are controlled to access different banks in the memory 1 simultaneously. Therefore, it is possible to use the memory bandwidth by multiple threads and to further bring out the performance of a HBM or HBM2, that is, make full use of the bandwidth. Although the implementation number of the hash computation circuits 8 is set to an equal number to the number of banks in the memory 1 in the present embodiment, the implementation number is not limited thereto. The hash computation circuits that are equal to or more than the banks may be implemented. However, when the hash computation circuits that are equal to or more than the banks are implemented, a hash computation circuit that cannot output a read request to a bank, that is, cannot perform hash computation is generated and becomes a waste. Further, when the hash computation circuits that are equal to or more than the banks are implemented, it is necessary to introduce an arbitration logic circuit in a bus (an interconnect), resulting in increase of the implementation area of the bus. Accordingly, it is preferable that the number of hash computation circuits is equal at most to the number of banks.

<Control of Access to Memory>

In order to allow the hash computation circuits 8 to respectively access different banks in the memory 1 simultaneously, read requests to the respective banks in the memory 1 are required which do not conflict with each other.

In the present embodiment, in connection between I/Os of the hash computation circuits 8 and I/Os of the banks in the memory 1, a bus is configured to prevent banks that are to be accessed simultaneously from overlapping each other. Accordingly, it is possible for the hash computation circuits 8 to respectively access the different banks in the memory 1 simultaneously.

<Summary of Actions and Effects of Aspects in the Present Embodiment>

<First Aspect>

An information processing device according to the present aspect is characterized in that, in the information processing device including the memory 1 having a plurality of banks, the hash computation circuits 8, and the interconnect 2 that respectively connects the banks in the memory 1 and the hash computation circuits 8 to each other, each of the hash computation circuits 8 executes control in such a manner that read requests for reading data from the memory 1 respectively include bank numbers for specifying different banks in the same cycle.

According to the present aspect, each of the hash computation circuits 8 executes control in such a manner that read requests for reading data from the memory 1 respectively include bank numbers for specifying different banks in the same cycle. Therefore, a plurality of hash computation circuits always access banks in a memory which do not overlap each other, thereby being able to efficiently read DAG data from the memory.

<Second Aspect>

The information processing device according to the present aspect is characterized in that the memory 1 memorizes DAG data calculated beforehand therein, the hash computation circuit 8 includes the hash computation unit 21, the thread portion 23, the thread controller 25, the address-generation and bank-determination unit 27, the FIFOs 29 the number of which is equal to the number of banks, the selector 31, and the counter 33, the hash computation unit 21 performs hash computation based on DAG data read from the memory 1, the address-generation and bank-determination unit 27 performs hash computation for input data based on a context of the thread portion 23 to obtain a bank number of a bank and an address where a DAG dataset to be accessed is stored and stores data in one of the FIFOs 29 which has an equal number to the bank number, and the selector 31 determines the FIFO 29 based on a counter value to be input thereto.

According to the present aspect, the hash computation unit 21 performs hash computation based on the DAG data read from the memory 1, the address-generation and bank-determination unit 27 performs hash computation for input data based on a context of the thread portion 23 to obtain a bank number of a bank and an address where DAG data to be accessed is stored and stores data in one of the FIFOs 29 which has an equal number to the bank number, and the selector 31 determines the FIFO 29 based on a counter value to be input thereto, and counter initial values of the respective hash computation circuits 8 are set not to overlap each other. Therefore, the read requests from all the hash computation circuits are supplied to the memory 1 via the interconnect 2 without conflict, and the DAG data read from the memory 1 is also supplied to each of the hash computation circuits without conflict.

<Third Aspect>

The counter value to be input to the selector 31 according to the present aspect is characterized by being different between all the hash computation circuits 8.

According to the present aspect, since the counter value to be input to the selector 31 is different between all the hash computation circuits 8, the hash computation circuits 8 can respectively access different banks in the memory 1 simultaneously without conflict.

<Fourth Aspect>

The interconnect 2 according to the present aspect is characterized by being configured by a plurality of routers connected in butterfly connection.

According to the present aspect, because of the configuration of the interconnect 2 in which a plurality of routers are connected in butterfly connection, the read requests from all the hash computation circuits are supplied to the memory 1 via the interconnect 2 without conflict, and the DAG data read from the memory 1 is also supplied to each of the hash computation circuits without conflict.

<Fifth Aspect>

The interconnect 2 according to the present aspect is characterized by having stages the number of which is equal to the number of bits when the number of banks is represented in binary.

According to the present aspect, since the interconnect 2 has stages the number of which is equal to the number of bits when the number of banks is represented in two bits, it is possible to configure routes, the number of which is equal to the number of banks in the memory, within the interconnect 2.

<Sixth Aspect>

The interconnect 2 according to the present aspect is characterized by connecting each of the hash computation circuits 8 and one of the banks in the memory 1 to each other based on bank specifying information included in the read request RRq to supply the read request RRq to the one bank in the memory 1.

According to the present aspect, the interconnect 2 connects each of the hash computation circuits 8 and one of the banks in the memory 1 to each other based on bank specifying information included in the read request RRq to supply the read request RRq to the one bank in the memory 1. Accordingly, it is possible to respectively connect the hash computation circuits 8 and the banks in the memory 1 to each other by the interconnect 2 in one-to-one connection.

<Seventh Aspect>

The interconnect 2 according to the present aspect is characterized by connecting the hash computation circuits 8 and the memory 1 to each other based on the number of one of the hash computation circuits 8 included in the read request RRq to supply data read from the memory 1 to the one of the hash computation circuits 8 which has the number.

According to the present aspect, the interconnect 2 connects the hash computation circuits 8 and the memory 1 to each other based on the number of one of the hash computation circuits 8 included in the read request RRq to supply data read from the memory 1 to the one hash computation circuit 8. Accordingly, it is possible to supply the data read from the memory 1 to the one hash computation circuit 8 which has the number.

REFERENCE SIGNS LIST 1 memory, 2 interconnect, 2A address router, 2D data router, 3 hash computation cluster, 4 nonce generation circuit, 5 check circuit, 6 Keccak circuit (512), 7 Keccak circuit (256), 8 hash computation circuits, 14A routing portion, 21 hash computation unit, 23 thread portion, 25 thread controller, 26 thread controller, 27 address-generation and bank-determination unit, 29 FIFO, 31 selector, 33 counter, 35 address decoder, 100 information processing device.

What is claimed is:

1. An information processing device comprising:
a memory including a plurality of banks;
a plurality of hash computation circuits; and
an interconnect that respectively connects the banks in the memory and the hash computation circuits to each other, wherein
the hash computation circuits of even number are assigned to a first half of a number of the banks of the memory, the hash computation circuits of odd number are assigned to a second half of a number of the banks of the memory, in each of the hash computation circuits, a selector, in which counter values are input from a counter that counts up by 1 per cycle with all initial counter values set to different values, selects read requests that respectively specify a bank with a bank number equal to the counter values such that the read requests from each of the hash computation circuits for reading data from the memory respectively specify different banks in a same cycle, a routing portion of the interconnect is set up so that arbitration of the read requests from each of the hash computation circuits does not occur by wire connection of butterfly connection, the memory memorizes DAG data calculated beforehand therein, DAG indicating directed acyclic graph files of a large dataset, the hash computation circuits each include a hash computation unit, a thread portion, a thread controller, an address-generation and bank-determination unit, FIFOs number of which is equal to number of the banks, a selector, and a counter, the hash computation unit performs hash computation based on DAG data read from the memory, the address-generation and bank-determination unit performs hash computation for input data based on a context of the thread portion to obtain a bank number of a bank and an address where DAG data to be accessed is stored, and stores each of the read requests in one of the FIFOs which has an equal number to the bank number, the counter has a different initial value and outputs the count value obtained by performing a counting operation in synchronization to the selector, and the selector determines the FIFO based on a counter value to be input thereto.

2. The information processing device according to claim 1, wherein the counter value to be input in synchronization to the selector is different between all the hash computation circuits at the same time.

3. The information processing device according to claim 1, wherein the interconnect is configured by a plurality of routers connected in butterfly connection.

4. The information processing device according to claim 3, wherein the interconnect has stages number of which is equal to number of bits when number of the banks is represented in binary.

5. The information processing device according to claim 4, wherein the interconnect connects each of the hash computation circuits and one of the banks in the memory to each other based on bank specifying information included in a corresponding one of the read requests, to supply the read requests to the banks in the memory.

6. The information processing device according to claim 5, wherein the interconnect connects each of the hash computation circuit and the memory based on a hash computation circuit number included in the read requests, to supply data read from the memory to one of the hash computation circuits having the hash computation circuit number.

* * * * *